Patented Aug. 18, 1953

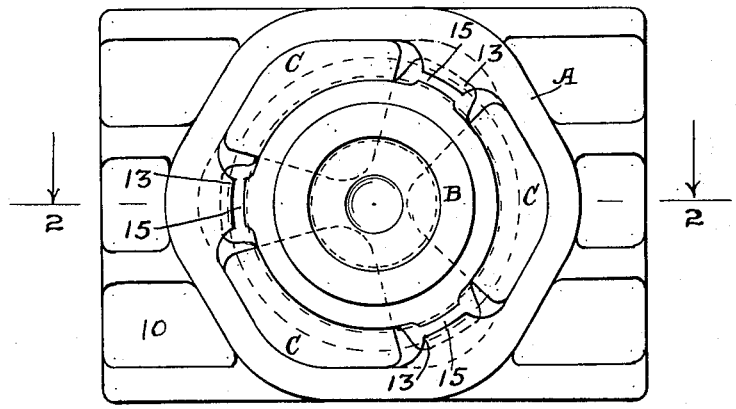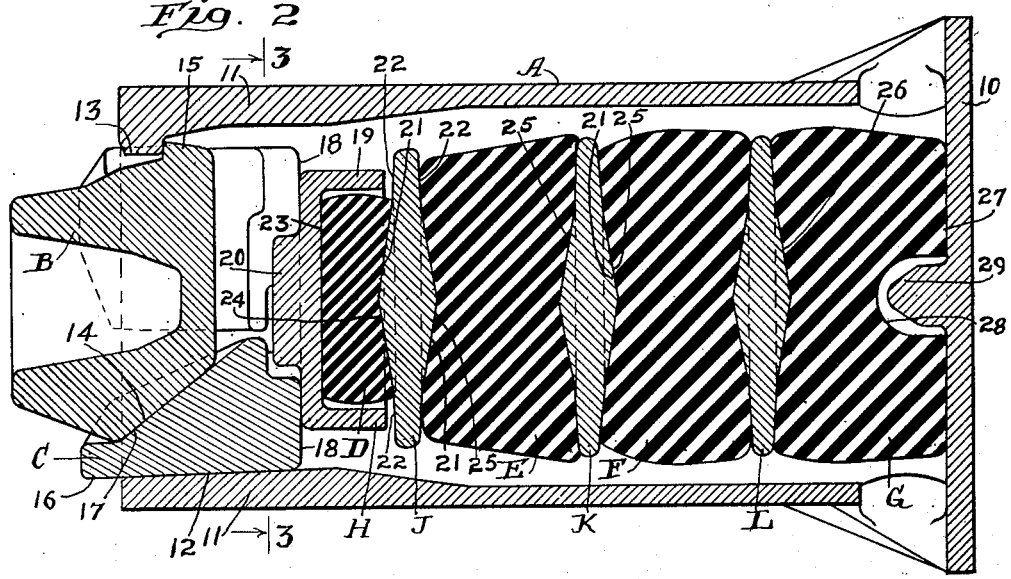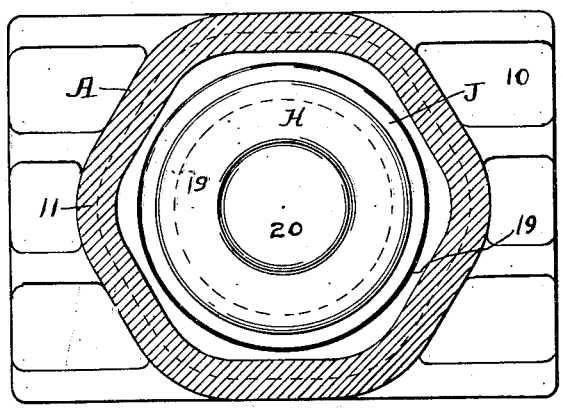

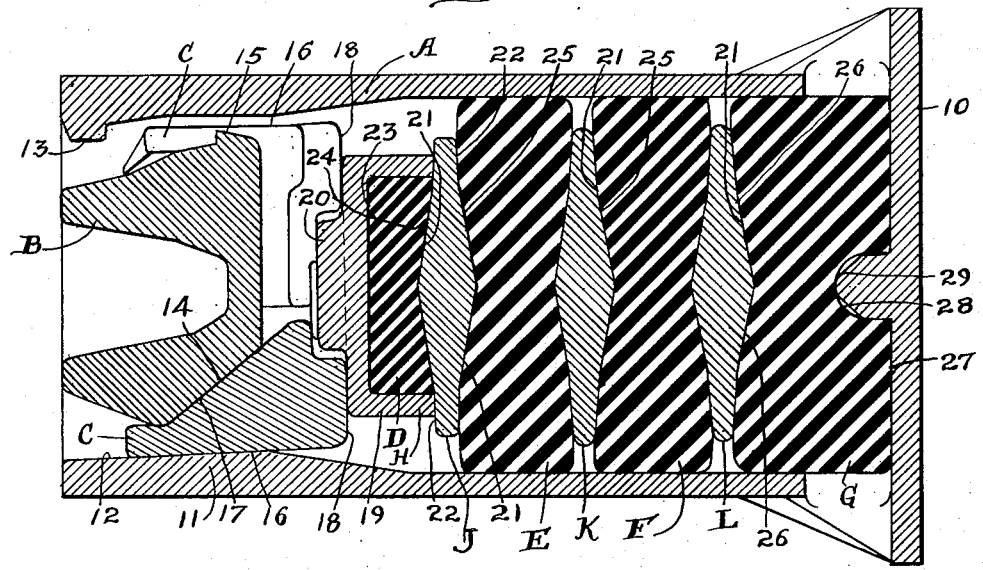
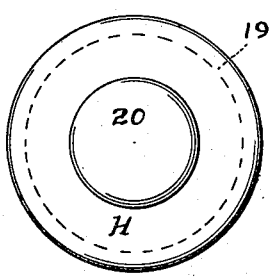
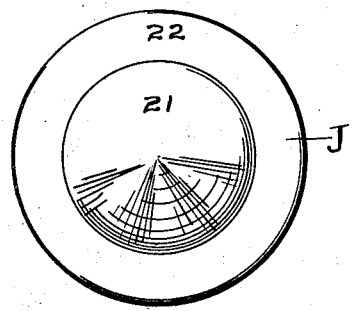
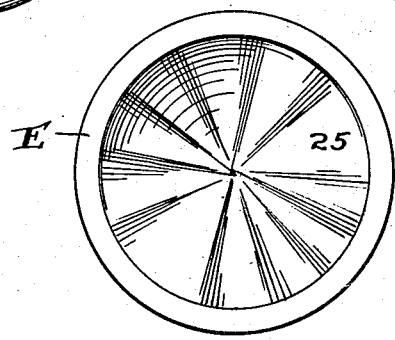

2,649,213

UNITED STATES PATENT OFFICE 2,649,213

FRICTION SHOCK ABSORBING MECHANISM FOR RAILWAY DRAFT RIGGINGS

William E. Withall, Hinsdale, Ill., assignor to W. H. Miner, Inc., Chicago, Ill., a corporation of Delaware Application April 30, 1949, Serial No. 90,652

1 Claim. (Cl. 213—45)

This invention relates to improvements in friction shock absorbing mechanisms especially adapted for railway draft riggings.

One object of the invention is to provide a friction shock absorbing mechanism comprising a friction casing, friction shoes slidingly telescoped within the casing, a wedge pressure transmitting member having wedging engagement with the shoes, and yielding means within the casing opposing inward movement of the shoes, wherein the yielding means is composed of a plurality of rubber cushioning members arranged in series, and alternated with metal spacing plates, the cushioning elements of said series being in the form of rubber blocks of a size to provide substantial clearance between the casing side walls and the blocks in the normal expanded condition of the mechanism, the blocks of said series decreasing in volume from rear to front of the series, whereby, as the mechanism is compressed, ample clearance is provided between the casing walls and said blocks to prevent binding of the latter in said casing, which might otherwise occur, with resultant damage to the blocks, due to dragging on the casing walls.

A further object of the invention is to provide in a mechanism as set forth in the preceding paragraph, means for protecting the first block of said series against damage, in the form of a cap having a cylindrical flange overhanging said block, the flange of said cap being engageable with the adjacent spacing plate of the rubber cushioning element to limit compression of said first block.

Other objects of the invention will more clearly appear from the description and claim hereinafter following.

In the accompanying drawings forming a part of this specification, Figure 1 is a front elevational view of my improved friction shock absorbing mechanism. Figure 2 is a horizontal longitudinal sectional view, corresponding substantially to the line 2—2 of Figure 1. Figure 3 is a transverse, vertical sectional view, corresponding substantially to the line 3—3 of Figure 2. Figure 4 is a view, similar to Figure 2, showing the mechanism fully compressed. Figure 5 is a front elevational view of the follower cap shown in Figure 2, looking from left to right in said figure. Figure 6 is a front elevational view of the spacing plate at the left hand end of the series, as seen in Figure 2. Figure 7 is a front elevational view of the second rubber block of the series, considered from left to right of said series, as viewed in Figure 2.

As shown in the drawings, my improved friction shock absorbing mechanism comprises broadly a friction casing A, a wedge block B, three friction shoes C—C—C, four rubber blocks D, E, F, and G, a follower cap H, and spacing plates J, K, and L.

The casing A is in the form of a hollow, tubular member, open at its front end and closed at its rear end by a transverse wall 10, which is extended laterally outwardly beyond the sides of the casing to provide a rear follower member, which is integral with the casing, and cooperates with the usual rear stop lugs of the center sills of a railway car. The casing A is of hexagonal, interior and exterior, transverse cross section and the walls thereof are inwardly thickened at its front or open end. This thickened wall portion of the casing provides the friction shell proper 11 of the same, presenting three inwardly converging friction surfaces 12—12—12 of V-shaped transverse cross section, each friction surface 12 being formed by the interior faces of two adjacent walls of the hexagonal casing. At the open end, the casing A is provided with three inturned stop lugs 13—13—13, which are alternated with the V-shaped friction surfaces of the casing, the same being at the corners between adjacent of said V-shaped surfaces.

The wedge B is in the form of a block having a set of three wedge faces 14—14—14 at its inner end, which are arranged symmetrically about the central longitudinal axis of the mechanism and converge inwardly thereof. Each wedge face 14 is of V-shaped transverse cross section. At its inner end, the wedge B has three laterally outwardly projecting, radial lugs 15—15—15, which are alternated with the wedge faces 14—14—14. In other words, the lugs 14 are arranged so that they are located between adjacent wedge faces and extend between adjacent shoes C—C to engage in back of the lugs 13 of the casing to restrict outward movement of the wedge B and hold the parts of the mechanism assembled. The front end of the wedge B receives the actuating force, bearing on the usual front follower, not shown, of the draft rigging.

The friction shoes C—C—C are interposed between the faces 14—14—14 of the wedge B and the friction surfaces 12—12—12 of the casing A. The three shoes are of similar design, each having an outer, longitudinally extending V-shaped friction surface 16, engaged with one of the friction surfaces 12 of the casing, and having a lateral enlargement on its inner side, presenting a wedge face 17 of V-shaped, transverse section, engaging the corresponding V-shaped wedge face 14 of the wedge block B. The extreme inner ends of the shoes, beyond the enlargements thereof, present transverse, flat abutment faces 18—18—18 on which the follower cap H bears.

The rubber cushioning means, comprising the rubber blocks D, E, F, and G, is disposed within the casing A and yieldingly opposes inward movement of the shoes C—C—C. The block D, which is at the front or left hand end of the series, as seen in Figure 2, is seated in the follower cap H, which bears on the shoes C.

The rubber blocks D, E, F, and G are all of substantially circular cross section, the block D being of considerably lesser volume and of smaller diameter than the blocks E, F, and G. The block E is of lesser volume than the block F and the latter is of lesser volume than the block G.

The follower cap H, within which the block D is housed, is in the form of a cup-shaped member, having a rearwardly extending, peripheral, cylindrical flange 19, which overhangs the block D. At its forward side, the cap H bears on the flat end faces 18 of the shoes C. This cap has a forwardly extending, central boss 20, which is engaged between the shoes.

The spacing plates J, K, and L are interposed, respectively, between the blocks D and E, E and F, and F and G. Each plate J, K, and L is in the form of a heavy metal disc, having centrally disposed, relatively shallow, conical projections 21—21 at the front and rear sides thereof. The peripheral portions of said plates, outwardly beyond the conical projections thereof, are slightly tapered, as indicated at 22—22. The rubber block D has a flat front face 23, bearing on the flat inner side of the cap H, and has its rear face conically depressed, as indicated at 24, to accommodate the conical projection 21 at the forward side of the plate J. Each of the rubber blocks E and F has conical, central depressions 25—25 at the front and rear sides, the conical rear projection 21 of the plate J being seated in the depression 25 at the front side of the block E, the front and rear projections 21—21 of the plate K being seated in the depression 25 at the rear of the block E and the depression 25 at the front of the block F, respectively, and the front projection 21 of the plate L being seated in the rear depression 25 of the block F. The rubber block G has a central, conical depression 26 in its front side, within which the conical projection 21 at the rear side of the plate L is seated. The rear side of the block G is substantially flat, as indicated at 27, bears on the inner side of the wall 10 of the casing, and has a central, rearwardly opening seat 28, adapted to accommodate an inwardly projecting centering lug 29 on the wall 10 of the casing. As shown in Figure 2, which illustrates the normal full release position of the mechanism, the rear edge of the flange 19 of the cap H is normally spaced from the plate J and clearance is provided between the periphery of the block D and the inner surface of the flange 19 of the follower cap. Also there is considerable clearance provided between the peripheries of the blocks E, F, and G and the interior side walls of the casing A. In said normal position of the parts of the mechanism, the rubber blocks are shaped generally as shown in Figure 2, the block E tapering toward its front end.

The operation of my improved friction shock absorbing mechanism is as follows: During compression of the mechanism, the wedge B is forced inwardly of the casing A, thus spreading the yieldingly resisted friction shoes C—C—C apart, and sliding the same inwardly of the casing on the friction surfaces 12—12—12 thereof, thus producing frictional resistance between the friction surfaces of the casing and the shoes. As compression of the mechanism progresses, the rubber block D is compressed between the cap H and the spacing plate J, and the rubber blocks E, F, and G are compressed by the spacing plates J, K, and L. As the blocks D, E, F, and G are compressed, they are flattened out and expanded in circumference. Expansion of the block D is limited by the flange 19 of the enclosing follower cap H, and compression of this block is limited by movement of the cap H with respect to the plate J, being arrested by engagement of the cap with said plate. During compression of the mechanism, the rear block G of the series of rubber blocks remains stationary, being merely compressed against the rear wall 10 of the casing. However, the blocks D, E, and F are moved bodily rearwardly of the casing while being compressed. By making the blocks E and F of lesser volume than the blocks G, sufficient freedom of movement of these blocks rearwardly of the casing is assured to prevent the same from binding on the casing walls, the radial expansion of these blocks being less than that of the block G, thus preventing dragging of the same on the casing walls. The block G is of such a diameter that it engages the side walls of the casing when the mechanism is fully compressed. It should be further noted that the follower cap H, which houses the block D, prevents the latter from engaging the casing walls. The parts are so proportioned that, when the mechanism is fully compressed, as shown in Figure 4, all of the rubber blocks rearwardly of the block D contact the interior side walls of the casing.

Upon the actuating force being reduced, the parts of the mechanism are returned to the normal full release position, as shown in Figure 1, by the expansive action of the rubber blocks D, E, F, and G, the wedge B being limited in its outward movement by engagement of the lugs thereof with the lugs of the casing A.

I claim:

In a shock absorbing mechanism, the combination with a casing open at its front end; of a pressure transmitting member slidingly telescoped within said open end of the casing; yielding means within the casing opposing inward movement of said member, said yielding means including a plurality of rubber blocks arranged in series, and spacing plates alternated with said blocks; and a cup-shaped cap in which the first named block of said series is seated, said cap having an annular side wall completely surrounding said first named block, and a centering projection engaged with said member, the opening defined by said annular side wall of said cap being of such size that said annular wall limits lateral expansion of said first named block.

WILLIAM E. WITHALL.

References Cited in the file of this patent

UNITED STATES PATENTS

| Number | Name | Date |
|---|---|---|
| 113,664 | Higley | Apr. 11, 1871 |
| 754,671 | Miner | Mar. 15, 1904 |
| 775,216 | Graham | Nov. 15, 1904 |
| 1,251,083 | Miner | Dec. 25, 1917 |
| 1,251,089 | O'Connor | Dec. 25, 1917 |
| 2,321,845 | Nystrom et al. | June 15, 1943 |
| 2,463,373 | Gadbois | Mar. 1, 1949 |

FOREIGN PATENTS

| Number | Country | Date |
|---|---|---|
| 727,324 | France | Mar. 22, 1932 |
| 1,817 of 1878 | Great Britain | May 6, 1878 |
| 363,886 | Great Britain | Dec. 31, 1931 |